Nov. 10, 1959    J. KRITZ    2,911,825
MASS FLOW FLUID MEASUREMENT
Filed June 14, 1955    2 Sheets-Sheet 2

INVENTOR.
Jack Kritz
BY
ATTORNEYS

United States Patent Office 2,911,825
Patented Nov. 10, 1959

2,911,825
MASS FLOW FLUID MEASUREMENT
Jack Kritz, Flushing, N.Y.
Application June 14, 1955, Serial No. 515,351
10 Claims. (Cl. 73—194)

The present invention relates to the measurement of the mass of a flowing fluid and particularly to the measurement of the rate of mass flow or the total mass flow of a fluid through a pipe or duct or other container.

In my previous copending application Serial No. 437,360, now Patent No. 2,869,357, I have disclosed apparatus for measuring the density of a fluid and in my applications Serial No. 67,503 filed December 27, 1948, now Patent No. 2,826,912, Serial No. 209,295, filed February 3, 1951, now abandoned, Serial No. 209,296 filed February 3, 1951, now abandoned, and Serial No. 374,358, filed August 14, 1953, now Patent No. 2,831,348, and Serial No. 474,403, filed December 10, 1954, I have disclosed electroacoustic apparatus for measuring the volumetric rate of flow of a fluid. According to the present invention, the mass of the fluid flowing through a pipe or duct is measured, regardless of the manner in which the flow occurs or the changes in the density of the fluid, and a continuous indication is given of the rate of mass flow as well as the total mass flow of the fluid for any given period.

According to this invention, the mass of a fluid flowing through a pipe or other duct is measured by apparatus which comprises a first pair of electroacoustic transducers located on opposite sides of the pipe or in any other suitable manner for transmitting acoustic waves through the fluid in one direction. The electroacoustic transducers are connected by a feedback path, including a carrier wave generator connected to the transmitting transducer and receiving means preferably including an amplifier connected to the receiving transducer, the carrier wave generator being controlled by the waves received by the receiving means so as to produce a continuous train of pulses of carrier waves. A second pair of electroacoustic transducers may be located on opposite sides of the pipe and interconnected by a second feedback path for transmitting pulses of carrier waves through the fluid in a second direction different from the direction in which the first waves are transmitted. Each feedback path thereby produces a continuous train of pulses of carrier wave oscillations having a pulse repetition frequency corresponding to the velocity of propagation of the waves in the fluid. A circuit is connected to the two feedback paths for producing a series of pulses having a pulse repetition rate proportional to the flow velocity of the fluid. These pulses are used to trigger a rectangular wave generator. Another electroacoustic transducer is mounted in the pipe or duct in acoustic contact with the fluid and is supplied with constant frequency oscillations. An inductor is connected in series with the transducer for resonating said transducer, which may be a piezoelectric crystal. The amplitude of the oscillations applied by the oscillator is stabilized by a suitable stabilizing circuit. The voltage across the piezoelectric crystal is detected and used to clamp the amplitude of the rectangular wave produced by the rectangular wave generator. The duration of the rectangular wave is controlled by the pulses of one of said feedback paths so that the duration of the rectangular pulses is an integral multiple of the period of the pulses in said one feedback path. The duration of the rectangular pulses is then inversely proportional approximately to the velocity of propagation of the waves through the fluid. The repetition rate of the rectangular pulses, being proportional to the difference between the pulse repetition frequencies in the two feedback paths, is proportional to the flow velocity of the fluid, while the amplitude of the rectangular pulses is clamped to a value proportional to the acoustic impedance of the fluid. These rectangular pulses are then fed through a suitable coupling circuit such as a cathode follower to a meter which measures the average current of said pulses and therefore indicates the rate of mass flow of the fluid. The rectangular pulses are also fed to a suitable integrating circuit or computer which measures the total mass flow of the fluid during any desired period. The integrating or computing circuit may include a first and second condenser each connected in the plate circuit of an electron tube to which the rectangular pulses are supplied. Means are provided for clamping one of the condensers to a point of fixed potential while leaving the other condenser free to charge in response to the pulses. The potential of the charging condenser is compared by any suitable comparing circuit to a fixed reference voltage. When the potential on the charging condenser reaches the fixed reference voltage, an output pulse is produced which operates means for unclamping the other condenser. The charges on the condensers are measured by a counter which may be operated in response to the output pulses of the comparing circuit. Thus, the two condensers are unclamped and charged alternately so that continuous charging can occur, without an interruption during the time required for the counting and the discharging of the condensers. The condensers may be alternately connected to the fixed potential clamping means by a relay. In order to prevent an interruption of the charging of the condensers while the relay is changing over, additional means are provided for instantaneously unclamping the condenser about to be charged and holding said condenser unclamped until the relay operates.

An object of the present invention is to measure the rate of mass flow, or the total mass flow, or both, of a fluid.

Another object of the invention is to continuously measure and indicate the rate of mass flow or the total mass flow of a fluid and to provide such measurements and indications over a wide range of velocities of flow.

Another object of the invention is to correctly measure the mass flow of a fluid despite any variations in the flow velocity or even pulsations of the flow.

Another object of the invention is to provide mass flow measurements of a fluid over an extended range with a linear scale and with a high accuracy over the full scale.

A still further object of the invention is to measure and indicate the mass flow of a fluid through a pipe without appreciably impairing the flow or increasing the pressure drop in the pipe.

A still further object of the invention is to provide means for measuring the rate of flow or the total flow of a fluid through a pipe over a wide range of velocities without appreciable error due to changes of velocity, temperature, or other variables.

Other objects and advantages of the invention will be apparent from the following detailed description and the accompanying drawing in which.

Figure 1:
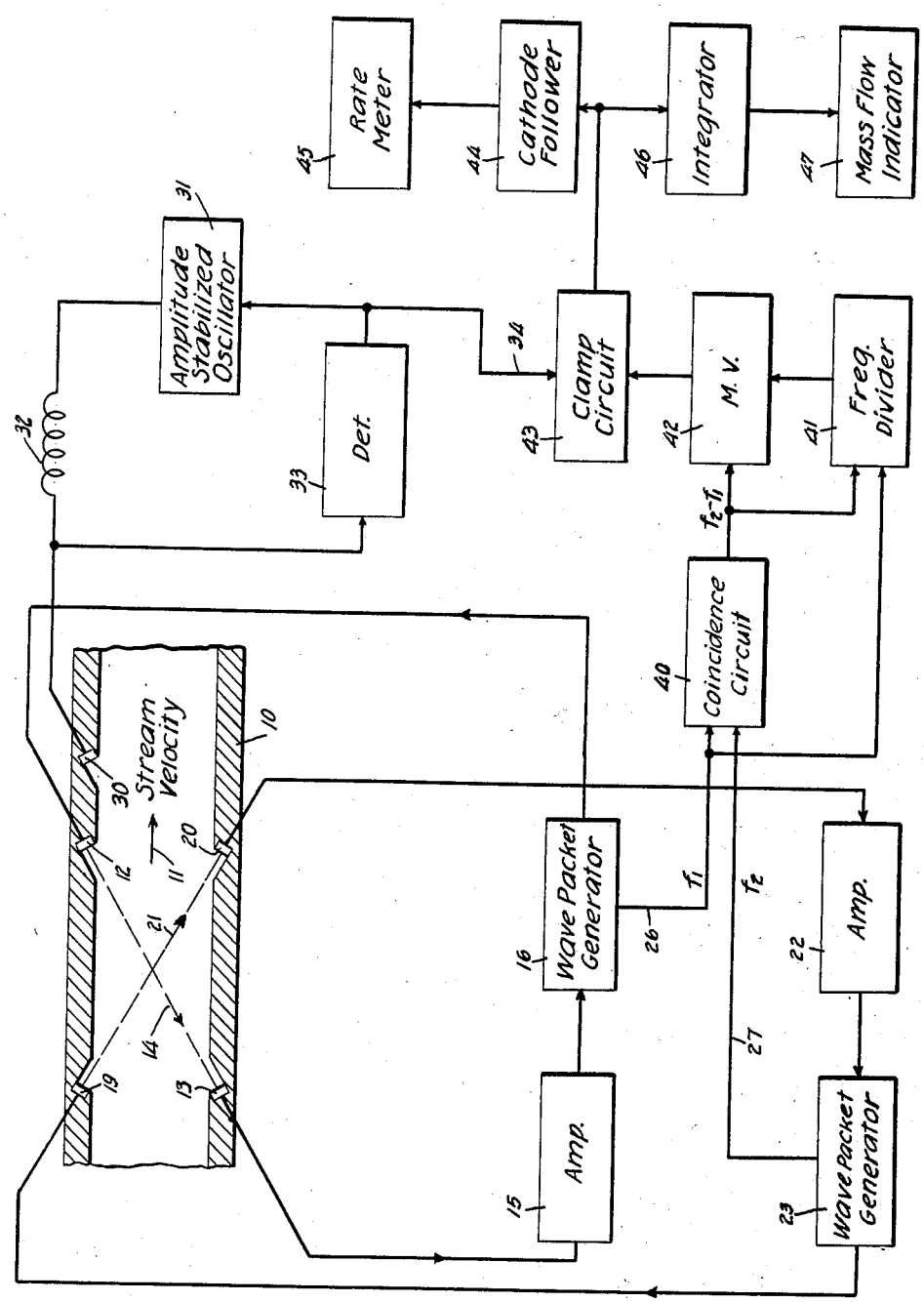
Fig. 1 is a block diagram of one embodiment of the invention.

Referring to Fig. 1, there is shown a fluid conduit 10 through which a fluid stream is adapted to flow, say in the direction of the arrow 11. A pair of transducers such as piezoelectric crystals 12 and 13 are mounted on opposite sides of the conduit or pipe 10 facing each other so that acoustic waves may be transmitted from the piezoelectric crystal 12 toward the crystal 13 in the direction of the arrow 14. The crystals 12 and 13 are interconnected by a feedback path consisting of an amplifier 15 and a wave packet generator 16 as disclosed in my application Serial No. 474,403 and corresponding British Patent No. 776,526. The feedback path and the transducer arrangement herein shown is merely illustrative and transducers and feedback paths of other types such as disclosed in any of my other copending applications mentioned above may be used. The subject matter of my prior applications is, therefore, to be considered as incorporated herein by reference. A second pair of electroacoustic transducers preferably in the form of piezoelectric crystals 19 and 20 are located in the conduit or pipe 10 for transmitting acoustic waves through the fluid in the direction indicated by the arrow 21. The receiving transducer 20 is connected through a feedback path to the transmitting transducer 19, which feedback path may consist of an amplifier 22 and a wave packet generator 23. The electrical oscillations received by the amplifiers 15 and 22 cause wave packet generators 16 and 23 to supply packets of oscillations to the transmitting transducers 12 and 19. In this manner, series of wave packets or pulses are transmitted through the fluid in the directions 14 and 21. As is fully explained in my copending applications, the pulse repetition frequency $f_2$ of the pulses in the feedback path 22, 23 will be proportional to $V+X \cos \theta$, while the pulse repetition frequency $f_1$ of the pulses through the feedback path 15, 16 will be proportional to $V-X \cos \theta$, where V is the propagation velocity when the fluid is at rest, X is the flow velocity and $\theta$ is the angle between the flow velocity and the direction or propagation of the waves in the fluid.

The pulse outputs of wave packet generators 16 and 23 are fed over connections 26 and 27 to a suitable mixing circuit which is preferably a coincidence circuit 40 adapted to produce an output pulse when two pulses are impressed thereon simultaneously by connections 26 and 27. Coincidence circuit 40 may be of any suitable type, such as circuit 16 in Patent No. 2,724,269 or circuit 112 of Patent No. 2,708,366. The output of the coincidence circuit will be a series of pulses having a repetition rate proportional to $f_2-f_1$ and these pulses are fed to a multivibrator 42, which generates a rectangular pulse in response to each output pulse of the coincidence circuit. Since $f_2-f_1$ is proportional to X, the multi-vibrator repetition frequency will also be proportional to X, the stream velocity. A frequency divider 41 is connected to one of the outputs 26 of the feedback path and the output of the frequency divider is applied to the multi-vibrator 42 to terminate the pulses which are started by the output of the coincidence circuit 40. The frequency divider may include a series of the well known scale-of-two counters, or be a counter of any other type. The frequency divider may produce any suitable frequency division, providing an output pulse for say about every 30 input pulses. The frequency divider 41 is controlled or gated by the output pulses of coincidence circuit 40 so that the frequency divider starts counting at the beginning of the rectangular pulse produced by multi-vibrator 42. The pulses fed to frequency divider 41 from line 26 have a frequency $f_1$ proportional to $V-X \cos \theta$, but since X is negligibly small compared to V, $f_1$ is substantially proportional to V. The pulses fed to the input of frequency divider 41 therefore have a period substantially proportional to $$\frac{1}{V}$$

The frequency divider will, say, count 30 pulses within a time proportional to $$\frac{30}{V}$$

and then supply an output pulse to multivibrator 42 to terminate the pulse therein which was initiated at the beginning of the count. The duration of the pulse produced by the multivibrator 42 is therefore proportional to $$\frac{30}{V}$$

and, hence, is proportional to the reciprocal of the velocity of propagation of the waves in the fluid. Suitable counters are available commercially and one form of usable counter is shown on page 234 of "Radar Electronics Fundamentals," published by the Government Printing Office. A suitable multi-vibrator is shown on page 192 of the same book. Thus, the pulses produced by multi-vibrator 42 have a repetition rate proportional to the stream velocity and a duration proportional to the reciprocal of the velocity of propagation of the waves in the fluid.

The rectangular pulses from multi-vibrator 42 are supplied to a clamping circuit 43 of any known type which clamps the amplitude of the rectangular pulses to the value of a voltage supplied by an input connection 34. This voltage is made proportional to the acoustic impedance of the fluid by a circuit which will now be described. The circuit for obtaining a voltage proportional to the acoustic impedance includes a piezoelectric crystal transducer 30 mounted on one wall of the container or pipe 10. A constant frequency oscillator 31 is connected to the transducer 30 through an inductor 32 which series resonates the transducer. When the crystal transducer 30 is tuned precisely to series resonance, the voltage drop across the crystal is substantially a linear function of the acoustic impedance of the fluid, $\rho V$, where $\rho$ is the density of the fluid and V is the wave propagation velocity, as is explained more fully in my Patent No. 2,869,357. The voltage across the crystal 30 is impressed on a detector 33. The output of detector 33 is fed to the stabilized oscillator 31 for compensating for the resistive voltage drop across the inductor 32. The details of oscillator 31 and detector 33 are fully shown and described in my Patent No. 2,869,357 and, therefore, will not be repeated herein.

The output voltage of detector 33, or a selected portion of this voltage, is applied to an amplitude control terminal of oscillator 31 so that the output of the oscillator is increased by an amount equal to the magnitude of the output voltage of the detector divided by the Q of the inductor 32. The voltage output of detector 33 is proportional to the acoustic impedance. The output of the detector 33 is fed also over the connection 34 to the clamping circuit 43 which clamps the amplitude of the rectangular wave from the multi-vibrator 42 to an amplitude corresponding to the output voltage of the detector 33, and hence to a value corresponding to the acoustic impedance of the fluid. Thus, the rectangular output wave from the clamped circuit 43 has an amplitude substantially proportional to the acoustic impedance, $\rho V$, a duration proportional to $$\frac{1}{V}$$

and a repetition rate proportional to the stream velocity X. Clamp circuit 43 may be of any suitable type, such as disclosed in my Patent No. 2,869,357.

The rectangular waves from the clamp circuit 43 are fed through a suitable coupling circuit such as a cathode follower 44 to means for measuring the rate of mass flow and is fed also to means for measuring the total mass flow of the fluid through the pipe 10. It will be evident that in order to measure the rate of mass flow it is only necessary now to measure the average current of the train of rectangular pulses and such a rate meter 45 is shown connected to the cathode follower 44. In order to measure the total mass flow of the fluid it is necessary to measure the total charge of all the rectangular pulses. Integrating circuits for accomplishing the integration of a series of pulses are well known and any such circuit may be used. Accordingly, a suitable integrator 46 is connected to the output of the clamp circuit 43 and the output of the integrator 46 is supplied to a device 47 of any type capable of measuring or counting the integrated charges.

Figure 2:
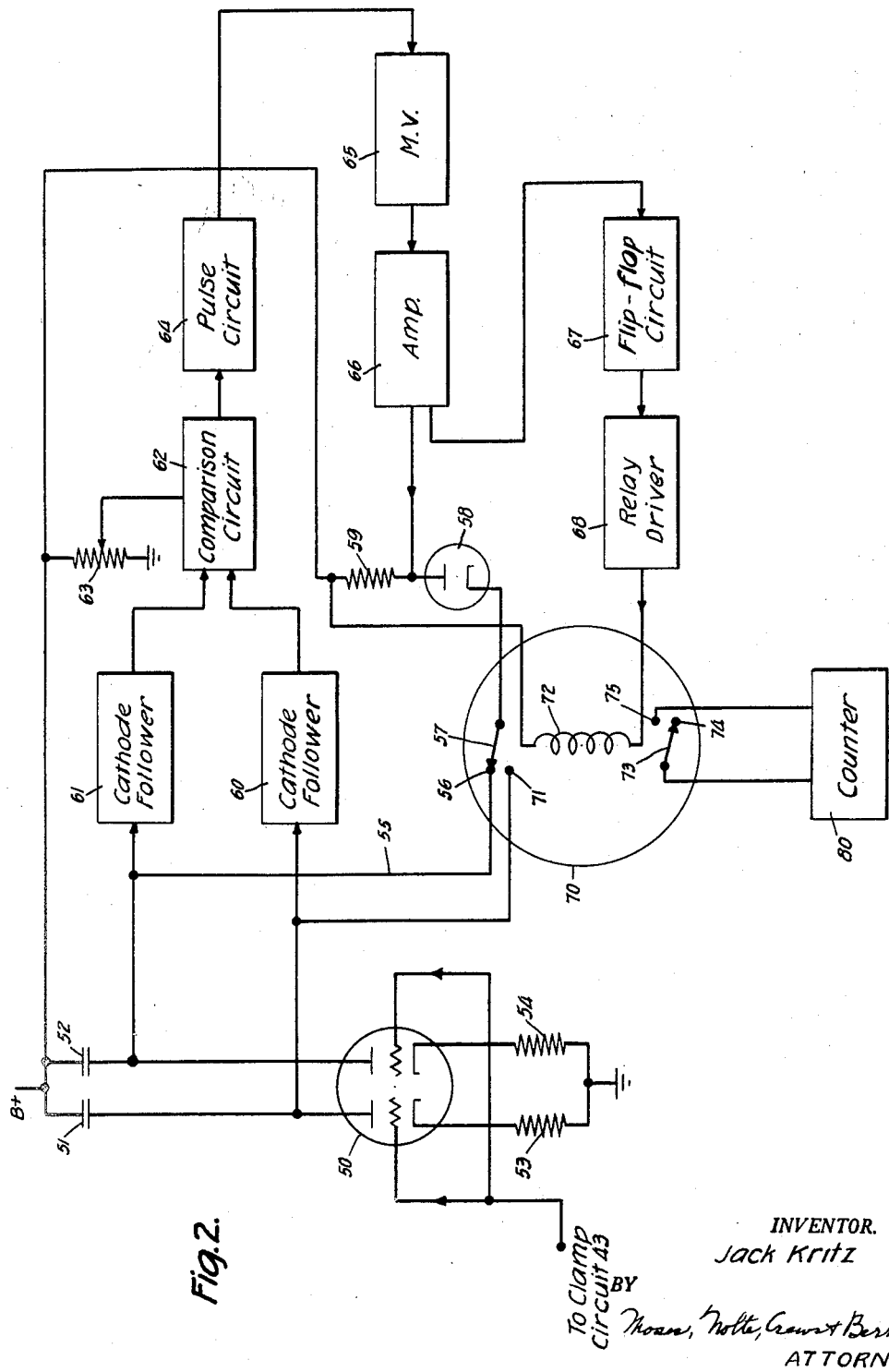
Fig. 2 is a schematic diagram of the apparatus for computing the total mass flow of the fluid.

Fig. 2 shows a circuit for integrating or computing the clamped rectangular pulses. The computing circuit comprises a pair of electron devices such as a dual triode 50 having a pair of anodes connected to a source of B+ voltage through condensers 51 and 52. The cathodes of tube 50 are connected to ground through resistors 53 and 54 which are sufficiently large to insure that the plate current follows the grid potential with good fidelity. One of the condensers 51 and 52 is clamped at a fixed potential while the other is free to charge in response to the incoming rectangular wave. The clamping circuit for condenser 52 extends over the connection 55 through the contacts 56 and 57, diode 58 and the resistor 59 to the B+ source. The lower end of condenser 52 is thus clamped at a fixed positive potential. The junction between the anodes of tube 50 and condensers 51 and 52 are connected separately to cathode followers 60 and 61. The outputs of both cathode followers 60, 61 are supplied to a voltage comparison circuit 62 to which a reference potential is also supplied from a voltage divider 63 connected to the same B+ source as condensers 51 and 52. When the potential of the charging condenser 51 reaches the reference voltage, the comparison circuit 62 becomes conductive. Comparison circuit 62 may be a pair of diodes having their anodes connected to the reference potential and their cathodes each connected to the outputs of the cathode followers 60 and 61. The comparison diodes are non-conductive until capacitor 51 or 52 is charged to a given voltage, causing the voltage on the cathode of a comparison diode to drop below the reference voltage and permit the diode to become conductive. Comparison circuit 62 controls a pulse generating circuit 64 which produces an output pulse when the comparison circuit becomes conductive. Triggered pulse generating circuits are widely known in the art and a few types thereof are disclosed on pages 192–206 of "Radar Electronic Fundamentals." Pulse circuit 64 is connected to a one-shot multi-vibrator 65.

The output of multi-vibrator 65 is fed to a flip-flop or Eccles-Jordan circuit 67 coupled to a relay driver or amplifier 68. The relay driver 68 alternately energizes and de-energizes the winding 72 of relay 70 in response to successive pulses from the flip-flop circuit 67. The winding 72 may operate a pair of double throw switch arms 57 and 73. When the contact arm 57 is in the position shown, the condenser 52 is clamped and when it throws to contact 71 condenser 51 is clamped to a fixed voltage. This reversal of clamping occurs whenever one of the condensers is charged to a predetermined voltage, representing a predetermined mass of fluid flow.

The winding 72 also operates a switch 73, 74, 75 which opens and closes the input circuit of any suitable counter 80, such as an electromechanical counter. Thus each count will represent the quantity of fluid mass corresponding to the charging of both condensers 51 and 52 to the fixed voltage. The total count obviously indicates the total mass flow of the fluid.

The reversal of the condenser clamping by the relay necessarily requires a certain amount of time, due to the fact that the relay 70 cannot be operated instantaneously. If a lapse of time occurs between the moment when one condenser, 51 or 52, is charged to the reference voltage and the moment when the other condenser is unclamped, an error would occur. In order to provide instantaneous unclamping of the uncharged condenser, the amplifier 66 impresses a negative pulse on the anode of diode 58 when the multivibrator 65 is triggered. This action cuts off diode 58 and unclamps the clamped integrating condenser. This preliminary unclamping action is maintained for a time sufficient to allow the switch arm 57 to throw over. The duration of the preliminary unclamping action may be readily set by adjusting the time constants of multivibrator 65 to cause it to produce a pulse of the required duration.

One embodiment of the invention has been shown and described, but it will be understood by those skilled in the art that many variations and modifications thereof, may be made without departing from the invention, the spirit and scope of which are defined in the following claims.

I claim:

1. Apparatus for measuring the mass flow of a fluid comprising first means for measuring the acoustic impedance of the fluid, second means for measuring the propagation velocity of acoustic waves in the fluid, third means for measuring the velocity of flow of the fluid, fourth means responsive to the second and third means for producing pulses having a repetition frequency proportional to the velocity of flow of the fluid and a duration proportional to the reciprocal of the velocity of the acoustic waves in the fluid, fifth means connected to said fourth means and responsive to said first means for adjusting the amplitude of the pulses produced by the fourth means proportionally to the acoustic impedance of the fluid, and sixth means responsive to said fifth means for measuring the mass flow of the fluid.

2. Apparatus according to claim 1, wherein the sixth means includes a meter for measuring the average current of said pulses to indicate the rate of mass flow of the fluid.

3. Apparatus according to claim 1, wherein the sixth means includes means for integrating the electrical charge of said pulses and means connected and responsive to said last means for indicating the total mass flow of the fluid.

4. Apparatus for measuring the mass flow of a fluid comprising a pipe through which said fluid is adapted to flow, a first pair of transducers comprising a transmitting transducer and a receiving transducer located on opposite sides of said pipe and spaced longitudinally therealong, first means interconnecting said transducers for transmitting acoustic waves upstream through the fluid from the transmitting transducer to the receiving transducer and for producing oscillations having a frequency corresponding to the propagation velocity of said waves in the fluid in the upstream direction, a second pair of transducers located on opposite sides of said pipe and spaced longitudinally therealong, a second means interconnecting said second pair of transducers for transmitting acoustic waves through the fluid downstream and for producing oscillations having a frequency corresponding to the propagation velocity of the acoustic waves in the downstream direction, means for combining the oscillations produced by said first and second means for producing a series of pulses having a pulse repetition rate proportional to the flow velocity of the fluid, means connected to said last mentioned means and in contact with the fluid for sensing the acoustic impedance of the fluid and for adjusting the amplitude of said pulses to a value proportional to the acoustic impedance of the fluid, means having an input connected to one of said interconnecting means and an output connected to said means for producing a series of pulses for making the duration of said pulses inversely proportional to the frequency of the oscillations produced in said one interconnecting means and measuring means responsive to said pulses.

5. Apparatus, according to claim 4, wherein said measuring means includes means for measuring the average current of said pulses and for indicating the rate of mass flow of the fluid.

6. Apparatus according to claim 4, wherein the measuring means includes means for integrating said pulses and means responsive to the integrated pulses for measuring the total current of said pulses and for indicating the total mass flow of the fluid.

7. Apparatus according to claim 6, wherein said measuring means includes a first condenser and a second condenser, means responsive to said pulses for charging said condensers, means for clamping one of said condensers to a point of fixed potential while leaving the other condenser free to charge in response to said pulses, means connected to said condensers for comparing the voltages thereon to a fixed reference voltage, means for producing a pulse when the voltage across either condenser reaches the reference voltage and means responsive to said last means for causing said clamping means to unclamp said one condenser and to clamp the other condenser to said fixed potential and counting means resposive to said last named pulse producing means.

8. Apparatus according to claim 7, wherein said clamping means includes a relay and means responsive to said last named pulse producing means for unclamping said one condenser during the time required for said relay to operate.

9. Apparatus according to claim 4 wherein the means for adjusting the amplitude of the pulses, includes a piezoelectric crystal mounted in said pipe in acoustic contact with the fluid, an oscillator connected to said crystal, means connected between the oscillator and the crystal for series-resonating said crystal, means for deriving a voltage proportional to the oscillatory voltage across said crystal and means connected to the last named means and the means for producing the series of pulses for adjusting the amplitude of the pulses in accordance with the magnitude of said voltage.

10. Apparatus according to claim 4, wherein said measuring means includes means for measuring the average current of said pulses and for indicating the rate of mass flow of the fluid and means for integrating said pulses and means responsive to the integrated pulses for measuring the total current of said pulses and indicating the total mass flow of the fluid.

References Cited in the file of this patent

UNITED STATES PATENTS

| | | |
|---|---|---|
| 2,573,390 | Blanchard | Oct. 30, 1951 |
| 2,669,121 | Garman et al. | Feb. 16, 1954 |
| 2,708,366 | Blocher et al. | May 17, 1955 |
| 2,711,646 | Mendousse | June 28, 1955 |
| 2,724,269 | Kalmus | Nov. 22, 1955 |

FOREIGN PATENTS

| | | |
|---|---|---|
| 603,644 | Great Britain | June 21, 1948 |
| 623,022 | Great Britain | May 11, 1949 |